J. C. DAYNIX.
MEASURING DEVICE.
APPLICATION FILED JUNE 1, 1920.
1,413,325.
Patented Apr. 18, 1922.
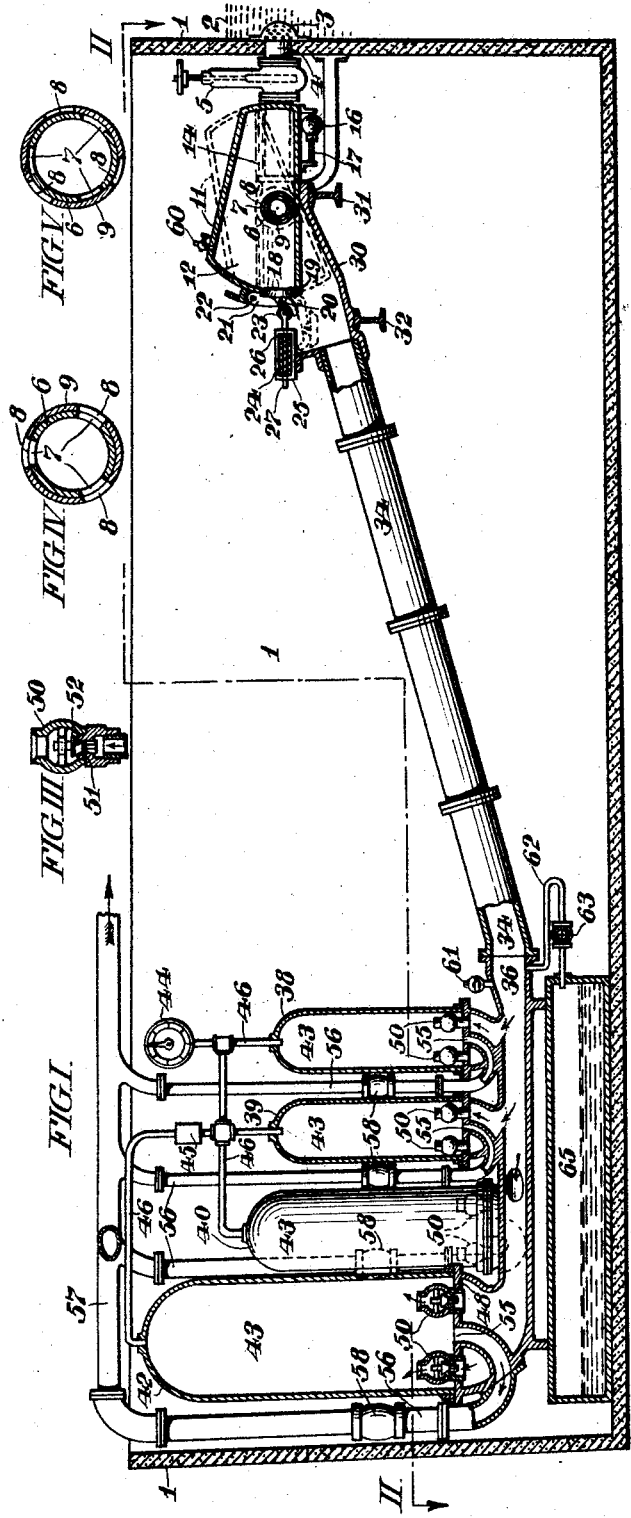
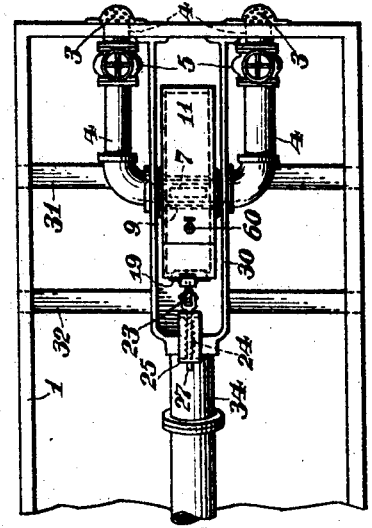
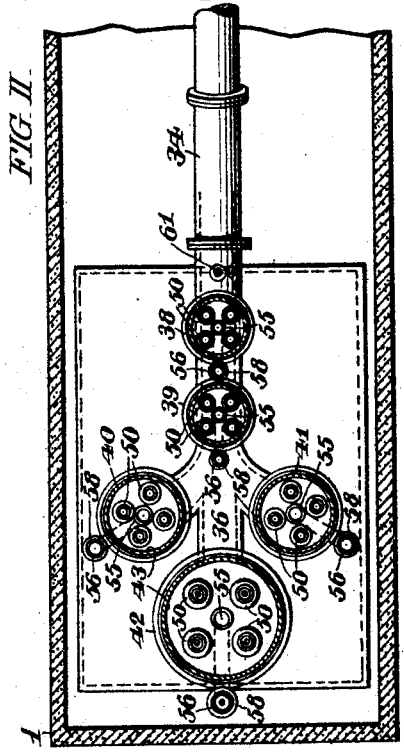
INVENTOR.
JOHN C. DAYNIX,
BY
ATTORNEY.

ial view of said apparatus, taken on the line
UNITED STATES PATENT OFFICE.

JOHN C. DAYNIX, OF PHILADELPHIA, PENNSYLVANIA.

MEASURING DEVICE.

1,413,325. Specification of Letters Patent. Patented Apr. 18, 1922.

Original application filed April 5, 1920, Serial No. 371,230. Divided and this application filed June 1, 1920. Serial No. 385,415.

*To all whom it may concern:*

Be it known that I, JOHN C. DAYNIX, a citizen of the United States, residing at Philadelphia, in the county of Philadelphia and State of Pennsylvania, have invented a certain new and useful Improvement in Measuring Devices, whereof the following is a specification, reference being had to the accompanying drawing.

This application is a division of my co-pending application Serial 371,230 for Letters Patent of the United States for improvement in hydrokinetic mechanism wherein the measuring device herein claimed is arranged to intermittently supply an impulse engine or group of engines with water; the transmissions of the supply being so timed as to correspond with the intervals of operation of such engines, so as to minimize the amount of water wasted; the effect of the combination claimed in said application being to supply water to such an engine only when it is ready to receive it and to withhold the water supply during such intervals as are required for the parts of the mechanism to resume their initial position to receive the next charge of water.

However, as hereinafter described, my present invention includes automatically intermittently operative mechanism capable of receiving, measuring and intermittently dispensing, at predetermined intervals, charges of predetermined volume of fluid or any material capable of flowing through the device.

In the form of my invention hereinafter described, such measuring mechanism includes a tiltable receiving and dispensing trap normally presented in position to receive the material to be dispensed, but arranged to automatically tilt from that position when it has received a predetermined quantity of such material and, by its tilting movement, shut off communication with the supply and dispense the charge of material which has been received by said trap; said trap having means to adjustably vary its operation, both as to the volume of material received for each charge and as to the intervals of time between its tilting movements; so that such measuring mechanism may be calibrated in accordance with any requirement as to the rate of dispensation of the material flowing through the apparatus.

My invention includes the various novel features of construction and arrangement hereinafter more definitely specified.

In said drawing; Fig. I is a vertical sectional view of an apparatus embodying my invention; parts thereof being shown in elevation.

Fig. II is a fragmentary plan sectional view of said apparatus, taken on the line II, II of Fig. I.

Fig. III is a vertical sectional view of one of the check valves through which water is received by the rams shown in Figs. I and II.

Fig. IV is a vertical sectional view of the water inlet valve of the tiltable trap shown in Figs. I and II; in the open position shown in Fig. I.

Fig. V is a sectional view of the valve shown in Fig. IV, but with the valve turned to closed position, corresponding with the position of said trap shown in dotted lines in Fig. I.

I find it convenient to mount my improved mechanism in a tank 1, indicated in Figs. I and II, which may be conveniently formed of reinforced concrete, extending below the level of the body of water 2 from which the apparatus is to be supplied. Water is admitted from said supply 2 through the perforated screens 3 to the inlet conduits 4 which are controlled by the valves 5 and connected with the valve tube 6. Said valve tube 6 is held stationary and provided with a circumferential series of three ports 7 adapted to register with the ports 8 in the valve casing 9, as indicated in Figs. I, IV, and V. Said valve casing is a fixture in the tiltable trap 11 which is thus pivotally supported upon said stationary valve tube 6 and contains the chamber 12 in which the charge of water 14 is received. Said trap 11 is so proportioned that when empty it gravitates to the position shown in full lines in Fig. I, but, when fully charged with water, gravitates to the position shown in dotted lines in said figure and is conveniently provided with the counterbalance 16 which may be adjusted by turning it on the screw shaft 17 which is mounted upon the bottom of said trap 11, in rigid relation therewith, so that the quantity of water 14 necessary to overbalance said trap to the position shown in dotted lines in Fig. I may be variably predetermined by the adjustment of said counterbalance 16. Said trap 11 has the discharge outlet 18 which is normally closed by the flap valve 19, in the position shown in Fig. I. Said valve 19 is pivoted at 20 upon the valve lever 21 which is fulcrumed at 22 upon said trap 11 and depends in operative relation with the roller 23 which is pressed into engagement therewith by the spring 24 in the stationary housing 25, by pressure of said spring upon the collar 26 on the plunger 27 which carries said roller and is mounted to reciprocate in said housing 25. Said housing 25 is conveniently fixed upon the hopper 30 which may be supported beneath the discharge end of said tiltable trap 11 in any suitable manner, conveniently by the I-beams 31 and 32 which extend transversely in said tank 1 as indicated in Figs. I and II. Said hopper 30 is thus adapted to receive the water discharged from said trap 11 through its outlet 18 aforesaid; such discharge being effected by the weight of the charge water 14 thrusting the valve 19 open to the position indicated in dotted lines in Fig. I, when said trap is tilted downwardly to the position shown, in dotted lines in said figure; the fulcrum 22 of said valve lever 21 being then below the level of said spring pressed roller 23 so as to free said valve 19 and its lever 21 from the pressure of said spring 24 which normally keeps said valve shut. Said hopper 30 is directly connected with the conduit 34, conveniently formed in sections, as indicated in Figs. I and II, and leading to the ram mechanism so as to supply water thereto in successive charges 14 at intervals predetermined by the position of the valves 5. That is to say; the rate at which such charges are received in the trap 11 and dispensed therefrom is dependent upon the rate of flow of the water from the body 2 to said trap 11 which latter rate is controlled by said valves 5.

The mechanism above described may be utilized to intermittently supply water to a hydrokinetic machine of the ram type of any suitable construction or arrangement. However, I prefer to employ the specific construction and arrangement shown in Figs. I and II, wherein said conduit 34 is connected with the base 36 supporting a group of five rams including two small rams, 38 and 39, which are of the same size; two larger rams 40 and 41 which are of the same size, but larger than said rams 38 and 39, and one ram 42 which is larger than any of the others. Aside from the fact that they are of different sizes, said rams 38, 39, 40, 41 and 42 are constructed and arranged and operate alike. Each of said rams includes a dome 43 in which air is confined under pressure indicated by the gauge 44 and regulated by the valve 45 which is adjustable to permit the automatic escape of air from said domes 43 through their respective pipes 46, if and when the pressure of said air exceeds a predetermined degree. Said domes 43 are respectively mounted upon respective base plates 48 of said base 36 and each is provided with a group of four water inlet check valves 50 which may be of any suitable form or construction, but are conveniently of the puppet type, best shown in Fig. III, wherein the valve casing is provided with the seat 51 for the reciprocatory puppet valve 52 which is adapted to be raised by water flowing upwardly from said base 36 to said domes 43 through said check valves, but which is normally closed, by gravity, in the position shown in Fig. III. When said valves 50 are thus closed, the water which has been injected through them into the domes 43 against the compressed air therein, is of course prevented from returning through said valves, but is then driven out of said domes 43 by the compressed air therein, through the discharge ports 55 which are conveniently concentrically arranged with respect to the groups of said valves 50 in the respective engines. As shown in Fig. I, said ports 55 are respectively provided with discharge conduits 56 leading to the manifold 57 which is common to all of said discharge conduits and through which the water is conveyed to its destination in the direction of the arrow shown on said manifold 57 in Fig. I. I also find it convenient to provide each of said conduits 56 with a check valve 58, and said valves 58 may be of the same construction and arrangement as the valves 50 and as shown in Fig. III.

The mechanism above described operates as follows: Said valves 5 being opened to the extent necessary to supply water to the group of engines at the rate it can be utilized by the latter; said trap 11, which is normally in the position shown in full lines in Fig. I, in which its inlet ports 7 are open, is gradually filled, to the level indicated, with a water charge 14 and, thereupon, said trap is automatically tilted, by the weight of said water charge 14, from the position shown in full lines in Fig. I to the position shown in dotted lines in said figure, thus automatically closing the inlet ports 7 and opening the outlet port 18 of said trap 11 and discharging that water charge downwardly through the conduit 34 into the engine base 36. Said conduit 34 is so proportioned both in diameter and length that the water thus transmitted therethrough attains the desired velocity when it reaches the inlet valves 50 of the respective engines so as to open the latter and pass into the respective domes 43 in opposition to the pressure of the air which is compressed therein. During the interval of time while the puppets 52 of said valves 50 are resuming their initial closed position shown in Fig. III, and the water is being driven from said domes 43 through said ports 55 and check valves 58 of the respective engines; said tank 11 automatically returns to its initial position, shown in full lines in Fig. I, because when thus emptied, it is overbalanced by the weight 16 and therefore gravitates to the position shown in full lines in Fig. I, thus again opening its inlet ports 7; so that, by the time equilibrium is restored in said engine domes 43, another water charge 14 is delivered thereto.

I find it convenient to provide said trap 11 with the air vent cock 60 and to also provide said base 36 with the air vent cock 61 to permit the operator to manually release any surplus of compressed air thereat.

The operation above described does not cause said engine to raise all of the water of each charge 14 and the surplus is permitted to escape from said base 36 through the drain pipe 62, under control of the valve 63, to the drain tank 65 from which it may be continuously or intermittently withdrawn.

Although I have shown a group of five hydrokinetic engines, it is obvious that my invention may be embodied in mechanism including any desired number of units and, of course, may be embodied in mechanism including but a single ram. Moreover, it is obvious that said charging mechanism may be otherwise constructed and arranged.

Therefore, I do not desire to limit myself to the precise details of construction and arrangement herein set forth, as various modifications may be made therein without departing from the essential features of my invention, as defined in the appended claims.

I claim:

1. Measuring mechanism constructed and arranged to dispense measured charges of material, including a tiltable trap having a valve casing concentric with its axis of oscillation and provided with an inlet port; a material supply conduit extending in said valve casing, and having a port adapted to register with the port in said casing in one position of said trap, and to be closed by said casing in another position of said trap; a valve arranged to control the outlet of material from said trap, and having a lever fulcrumed on said trap; and a spring pressed roller constructed and arranged to bear upon said valve lever and close the outlet of said trap in one position of the latter, but permit said outlet valve to open in another position of said trap.

2. Measuring mechanism constructed and arranged to dispense measured charges of material, including a tiltable trap having a valve casing concentric with its axis of oscillation and provided with an inlet port; a material supply conduit extending in said valve casing, and having a port adapted to register with the port in said casing in one position of said trap, and to be closed by said casing in another position of said trap; a valve arranged to control the flow of material through said conduit to said trap; a valve arranged to control the outlet of material from said trap, and having a lever fulcrumed on said trap; and a spring pressed roller constructed and arranged to bear upon said valve lever and close the outlet of said trap in one position of the latter, but permit said outlet valve to open in another position of said trap.

3. Measuring mechanism constructed and arranged to dispense measured charges of material, including a tiltable trap having a valve casing concentric with its axis of oscillation and provided with an inlet port; a material supply conduit extending in said valve casing, and having a port adapted to register with the port in said casing in one position of said trap, and to be closed by said casing in another position of said trap; a valve arranged to control the outlet of material from said trap, and having a lever fulcrumed on said trap; a spring pressed roller constructed and arranged to bear upon said valve lever and close the outlet of said trap in one position of the latter, but permit said outlet valve to open in another position of said trap; and means whereby the quantity of material necessary to tilt said trap may be adjustably varied, including a counterbalance, carried by said trap, and adjustably movable with respect to the axis of oscillation of said trap.

4. Measuring mechanism constructed and arranged to dispense measured charges of material, including a tiltable trap having a valve casing concentric with its axis of oscillation and provided with an inlet port; a material supply conduit extending in said valve casing, and having a port adapted to register with the port in said casing in one position of said trap, and to be closed by said casing in another position of said trap; a valve arranged to control the flow of material through said conduit to said trap; a valve arranged to control the outlet of material from said trap, and having a lever fulcrumed on said trap; and a spring pressed roller constructed and arranged to bear upon said valve lever and close the outlet of said trap in one position of the latter, but permit said outlet valve to open in another position of said trap; and means whereby the quantity of material necessary to tilt said trap may be adjustably varied, including a counterbalance, carried by said trap, and adjustably movable with respect to the axis of oscillation of said trap.

JOHN C. DAYNIX.

Witnesses:
ARTHUR E. PAIGE,
CAROLYN E. REUTER.